United States Patent
Platania et al.

(10) Patent No.: US 7,768,150 B2
(45) Date of Patent: Aug. 3, 2010

(54) POWER MANAGEMENT UNIT FOR BATTERY-OPERATED DEVICES

(75) Inventors: Giuseppe Platania, Catania (IT); Jerome Nebon, Grenoble (FR); Patrizia Milazzo, S. Agata Li Battiati (IT); Alexandre Balmefrezol, Sassenage (FR); Vincenzo Polisi, Santa Maria Di Lipodia (IT)

(73) Assignees: STMicroelectronics S.r.l., Agrate Brianza (MI) (IT); STMicroelectronics S.A., Montrouge (FR)

( * ) Notice: Subject to any disclaimer, the term of this patent is extended or adjusted under 35 U.S.C. 154(b) by 22 days.

(21) Appl. No.: 12/116,846

(22) Filed: May 7, 2008

(65) Prior Publication Data

US 2008/0278002 A1 Nov. 13, 2008

(30) Foreign Application Priority Data

May 7, 2007 (EP) .................................. 07290570

(51) Int. Cl.
*H02J 3/38* (2006.01)
(52) U.S. Cl. ........................................................ 307/19
(58) Field of Classification Search .................... 307/19
See application file for complete search history.

(56) References Cited

U.S. PATENT DOCUMENTS

| 6,507,172 | B2* | 1/2003 | Sherman | 320/134 |
| 7,348,767 | B2* | 3/2008 | Hack et al. | 323/316 |
| 2005/0174094 | A1* | 8/2005 | Purdy et al. | 320/134 |
| 2008/0265838 | A1* | 10/2008 | Garg et al. | 320/115 |

* cited by examiner

*Primary Examiner*—Robert L. Deberadinis
(74) *Attorney, Agent, or Firm*—Lisa K. Jorgenson; James H. Morris; Wolf, Greenfield & Sacks, P.C.

(57) ABSTRACT

A power management unit for a battery-operated electronic device having a bus interface for the interconnection with another electronic device, the power management unit including an electric energy storage element coupled between a battery of the battery-operated electronic device and a voltage supply line of the bus interface, the electric energy storage element being operable to charge/discharge electric energy; a drive circuitry arranged to control a charge/discharge of the electric energy storage element. The drive circuitry is operable to cause an electric power supplied by the other electronic device through the voltage supply line to re-charge the battery; or, in case the other electronic device does not supply electric power, cause the battery supply electric power to the other electronic device through the voltage supply line. The power management unit is particularly adapted for battery-operated, mobile USB OTG devices.

15 Claims, 3 Drawing Sheets

POWER MANAGEMENT UNIT FOR BATTERY-OPERATED DEVICES

BACKGROUND OF THE INVENTION

1. Field of the Invention

The present invention relates generally to the field of electronics, and specifically to the aspects of power supply management in electronic devices, more particularly in relation to the use of the USB (Universal Serial Bus) interface for the interconnection of mobile, battery-operated devices with other devices.

2. Discussion of the Related Art

In the last few years, mobile, battery-operated digital electronic devices like mobile (cellular) phones, digital cameras, camcorders, PDAs (Personal Digital Assistants) have experienced a massive diffusion through users.

The success gained by the USB as a means for the connection of Personal Computers (PCs) to PC peripherals like printers, keyboards, pointing devices, memory card readers, pen drives, just to cite some, has driven producers of consumer electronics devices to equip mobile devices with USB interfaces.

However, the USB standard (like, for example, the USB 2.0 specification) originally defined a host/peripheral relationship scheme wherein the PC is always the host, and devices that are plugged thereinto are always peripherals. In this interconnection scheme, the PC supplies the USB voltage to the peripherals connected thereto.

The desire of making it possible to directly connect one to another mobile electronic devices, without the need of a PC acting as a host (a use not supported by the original USB standard), has brought to the definition of a supplement specification to the USB standard, the so-called "USB OTG" (On-The-Go), which defines how two generic electronic devices, like for example two mobile electronic devices, connect to each other without the necessity of a PC.

Without entering into excessive details, well known to those skilled in the art, according to the USB OTG prescriptions, two device configurations are defined: "A-devices" and "B-devices". A-devices are devices that, by default, act as hosts when connected to other devices; B-devices are instead devices that act by default as peripherals. A USB OTG device can be either an A-device or a B-device, thus it has the capability of acting as a host or as a peripheral, based on a negotiation between the USB OTG device and the device(s) to which it is connected through the USB interface.

When a USB OTG device acts as a host, it is required to provide the USB voltage supply to the peripheral USB devices connected to it. The USB voltage supply is a voltage in the range from approximately 4.85 V to approximately 5.25 V. Since battery-operated mobile electronic devices are typically powered by a lithium (lithium ion or lithium polymer) battery, which provides a voltage in the range from approximately 3.0 V to approximately 4.2 V, a USB OTG device has to include a voltage step-up circuit arrangement, to increase the battery voltage to the prescribed USB voltage rating.

Voltage step-up circuits are commonly of the switched-mode type, and include one or more inductors.

Mobile electronic devices are significant users of battery power; for example, the several different and more and more complex multimedia functions that are currently implemented by a mobile phone have a significant impact on the device's power consumption. Thus, the device battery should be re-charged as quickly and as often as possible. Charging the mobile device battery through the USB interface when the device is connected to other devices acting as hosts, like for example a PC, and thus supplying the USB voltage supply, significantly contributes to maintaining charged the battery of the mobile device. To this purpose, a buck charger including a DC-DC voltage down-converter needs to be embedded in the mobile device.

Also DC-DC voltage down-converter circuits are commonly of the switched-mode type. Thus, USB OTG mobile electronic devices should include two or more inductors (and the respective switched-mode drivers), one for the voltage step-up and the other for the voltage down-conversion.

Inductors are relatively expensive, and are normally in the form of coils, i.e. discrete components, thus they occupy a non-negligible area in a printed circuit board.

This is in contrast to the trend toward reduction in size and costs of the mobile electronic devices.

The Applicant has observed that, in a battery-powered, mobile USB OTG device, the two functions, namely the DC-DC voltage down-conversion for charging the mobile device battery via the USB, exploiting the USB voltage supply supplied by a USB host connected to the USB OTG device, and the voltage step-up function, for increasing the battery voltage to the prescribed USB voltage value, to be supplied to a USB peripheral connected to the USB OTG device, are essentially never active at the same time. Indeed, when the mobile device acts as a USB host, it is responsible for supplying the USB voltage to the other USB device(s) connected thereto as peripherals, and cannot use the USB voltage to re-charge the battery; on the contrary, when the mobile device is not the host, it can exploit the USB voltage supplied by the host USB device to which it is connected to re-charge the battery.

SUMMARY OF THE INVENTION

Thus, the Applicant has found that, at best, just one coil or arrangement of coils is sufficient, and these components can be exploited for both the DC-DC down conversion and the voltage step-up functions.

Expediently, a same switched-mode driving circuit may be exploited, coupled to the single coil or arrangement of coils, for properly driving the coil or coils to either step-up the battery voltage to the USB voltage level, or down-converting the USB voltage to the battery voltage level, to recharge the battery.

According to an aspect of the present invention, there is provided a power management unit for a battery-operated electronic device having a bus interface, particularly a USB interface, for the interconnection with another electronic device, the power management unit comprising:

an electric energy storage element coupled between a battery of the battery-operated electronic device and a voltage supply line of the bus interface, the electric energy storage element being operable to charge/discharge electric energy;

a drive circuitry arranged to control a charge/discharge of the electric energy storage element, wherein the drive circuitry is operable to:

cause an electric power supplied by said another electronic device through the voltage supply line to re-charge the battery; or in case said another electronic device does not supply electric power, cause the battery supply electric power to said another electronic device through said voltage supply line.

Said electric energy storage element may include at least one inductor having a first terminal coupled between a battery of the battery-operated electronic device and a second terminal coupled to a voltage supply line of the bus interface, and said drive circuitry may be arranged to control a charge/discharge of the inductor.

In particular, the power management unit may be adapted to convert a first voltage received from said voltage supply line into a second voltage of said battery, lower than said first voltage.

Said drive circuitry may in particular be a switched-mode circuitry. It may comprise:
 a first switch coupled between the voltage supply line and the second terminal of the inductor;
 a second switch coupled between the second terminal of the inductor and a reference voltage terminal of the battery;
 a switch control circuit operable to control the first and second switch.

Said switch control circuit may be operable to generate PWM control signals, particularly on phase opposition, for controlling the opening and closing of the first and second switch.

According to another aspect of the invention, a battery-operated electronic device is provided, having a bus interface, particularly of the USB type, for the connection to another electronic device, and a power management unit according to any one of the preceding claims.

The power management unit is particularly, albeit not limitatively adapted to being employed in mobile electronic devices like mobile phones with USB connectivity.

BRIEF DESCRIPTION OF THE DRAWINGS

The features and advantages of the present invention will be best understood reading the following detailed description of an exemplary and non-limitative embodiment thereof, description that will be made in conjunction with the attached drawings, wherein.

DETAILED DESCRIPTION

Figure 1:
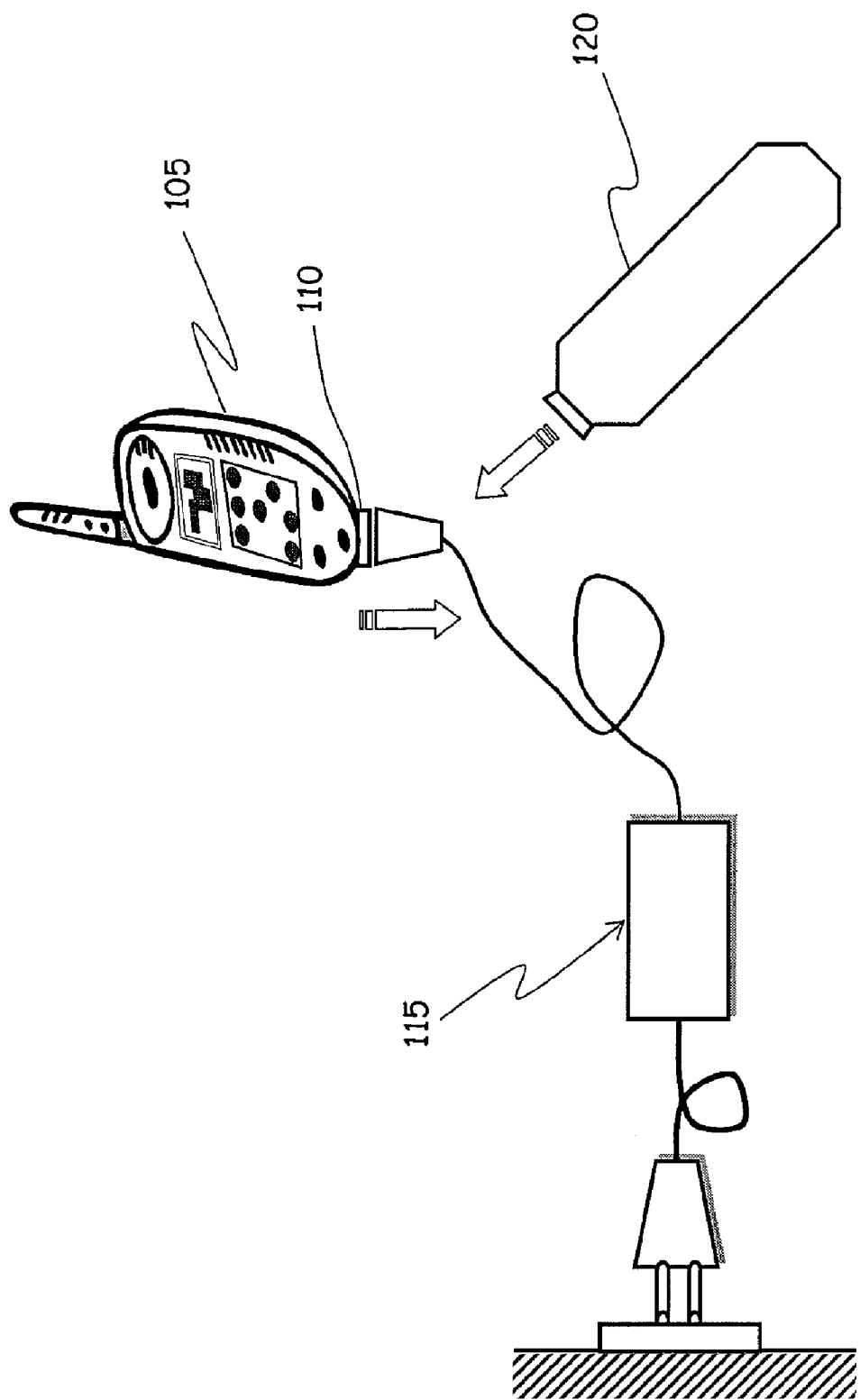
FIG. 1 schematically shows a scenario of a USB OTG mobile device, where a power management unit according to an embodiment of the present invention is usefully applied.

Referring to the drawings, FIG. 1 depicts an exemplary scenario where an embodiment of the present invention is advantageously exploited.

Reference numeral 105 denotes a mobile or cellular phone 105, particularly, albeit not limitatively, a second-generation or 2G mobile phone (like for example a GSM—Global System for Mobile communications—or GPR—General Packet Radio System—or EDGE—Enhanced Data rate for GSM Evolution) or a third-generation or 3G mobile phone (like, for example, a UMTS—Universal Mobile Telecommunications Standard). The mobile phone 105 may, as nowadays common, implement several multimedia functions in addition to pure mobile phone functions, like, for example, one or more among MMS (Multimedia Messaging Service) functions, digital still camera functions, camcorder functions, functions of receiver of DVB-H television signals (Digital Video Broadcasting—Handheld).

The mobile phone 105 is provided with a USB interface including a USB connector 110 for the connection to a USB cable, and an internal (not shown in the drawing) USB driver, for handling the communications with other devices through the USB bus. Through the USB connector 110, the mobile phone 105 can be connected to a USB battery charger 115, for charging a battery of the mobile phone 105. The USB battery charger 115 shown in the example can be plugged into the AC mains, and includes an AC/DC converter and a USB interface.

Through the USB connector 110, the mobile phone 105 may also be connected to other electronic devices provided with a USB interface, like for example a USB pen drive 120 for mass storage of data.

The mobile phone 105 is assumed to be a USB OTG device, so that when it is connected (through the USB connector 110) to the USB battery charger 115 (or to other USB host devices, like, for example, a PC, not shown in the drawing) it behaves as a USB peripheral, and it receives and exploits the USB voltage supply (nominally, 5 V+/−0.25 V) provided by the host device. When instead the mobile phone 105 is connected to the USB pen drive 115 (or to another USB device not capable of acting as a host, and in particular not able to generate the USB voltage), the mobile phone 105 behaves as a USB host, and supplies the USB voltage to the USB peripheral.

Figure 2:
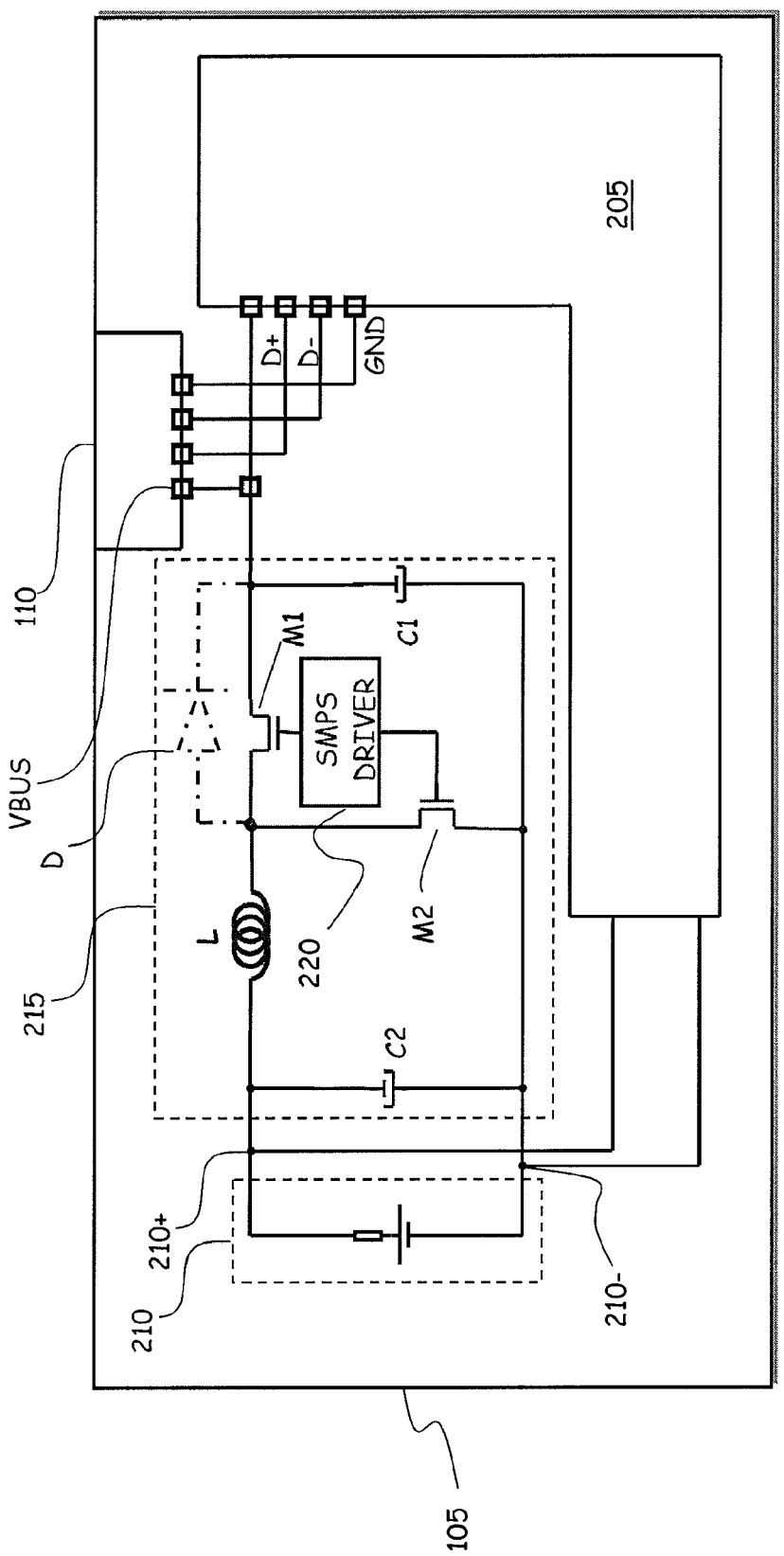
FIG. 2 schematically shows a power management unit according to an embodiment of the present invention.

FIG. 2 schematically shows a simplified, schematic block diagram of the mobile phone 105, including a power management unit according to an embodiment of the present invention.

The USB connector 110 comprises four terminals, namely a voltage supply terminal VBUS, a reference potential or ground terminal GND, and a pair of differential-voltage data terminals D+ and D−. The four terminals of the USB connector 110 are connected to a mobile phone internal circuitry 205, which is intended to include all the electronic circuits of the mobile phone except for the power management circuits; in particular, the mobile phone internal circuitry 205 is intended to include the circuits enabling the mobile phone 105 exchanging data with other electronic devices over the USB bus, particularly a USB controller.

The mobile phone 105 includes a battery 210 that provides the electrical energy for the mobile phone operation; in particular, the battery 210 supplies electrical energy to the internal circuitry 205. The battery 210 may, for example, be a lithium battery, particularly a lithium-ion or a lithium-polymer battery, adapted to supply electrical energy at a voltage in the range from approximately 3.0 V to approximately 4.2 V. It is intended that the specific type of battery is not limitative to the present invention.

The mobile phone 105 further includes a power management unit 215. According to an embodiment of the present invention, the power management unit 215 is designed to perform a first function of stepping up the voltage supplied by the battery 210, from the battery voltage to the USB voltage. The power management unit 215 is also designed to perform a second function of down-converting the USB voltage to the battery voltage.

The first function of the power management unit 215 allows making the mobile phone 105 operate as a USB host, supplying to the other USB devices, connected thereto through the USB connector 110 and over a USB bus, the voltage necessary for their operation.

The second function of the power management unit 215 allows the mobile phone 105 re-charge the internal battery 210 whenever it is connected, via the USB connector 110, to other USB devices acting as USB host, i.e. devices supplying the USB voltage, like for example a PC, or the USB charger 115.

According to an embodiment of the present invention, the power management unit 215 is designed to perform the first or the second functions disjointly, i.e. not at a same time. Thanks to this, according to an embodiment of the present invention, the power management unit 215 can be kept simple in structure, cheap and compact in size.

In an embodiment of the present invention, depicted in the drawing, the power management unit 215 comprises a first transistor M1, particularly but not limitatively a MOSFET (e.g., a power MOSFET), and even more particularly an N-channel power MOSFET, coupled between the USB terminal VBUS and a first terminal of an inductor L; a second terminal of the inductor L is coupled to a positive terminal 210+ of the battery 210.

The first terminal of the inductor L is also coupled to a first terminal of a second transistor M2, particularly but not limitatively a MOSFET (e.g., a power MOSFET), even more particularly an N-channel power MOSFET, having a second terminal coupled to a negative terminal 210− of the battery 210.

Control (gate) terminals of the first and second transistors M1 and M2 are driven by a switched-mode power supply (SMPS) driving circuit 220, adapted to generate PWM drive signals for the first and second transistors M1 and M2.

The SMPS driving circuit 220, the inductor L, the first and the second transistors M1 and M2 form a DC-DC conversion unit capable of stepping-up a voltage supplied by the battery 210, or to down-convert the USB voltage.

A first capacitor C1 is coupled between the USB terminal VBUS and the negative terminal 210− of the battery 210. A second capacitor C2 is coupled between the positive terminal 210+ of the battery 210 and the negative terminal 210− thereof. The first capacitor C1 is used to ensure the stability of the DC-DC conversion unit when the power management unit 215 devices works as a voltage step-up circuit. The second capacitor C2 is used to ensure the stability of the DC-DC conversion unit when the power management unit 215 works as a voltage step-down (down-conversion) circuit.

The switched-mode power supply driving circuit 220 is adapted to drive the first or second transistors M1 or M2 so as to transfer the energy from the source to a load through an inductor. The switching is accomplished by driving the first or second transistors M1 or M2 with a PWM (Pulse Width Modulated) control signal. By varying the duty cycle of the PWM control signal controlling the first or second transistors M1 or M2, and thus the charge and discharge time of the inductor, the ratio of the input voltage to the output can be regulated. A feedback circuit (not shown in the drawing) monitors the output voltage and adjusts the charge/discharge duty cycle appropriately to maintain a constant output voltage.

Depending on whether the mobile phone 105 behaves as a USB host or peripheral, the USB voltage source is either the mobile phone battery 210 or a host device connected to the mobile phone 105 through the USB connector 110, and the load is either a peripheral device connected through the USB to the mobile phone 105 or the battery 210.

Figure 3A:
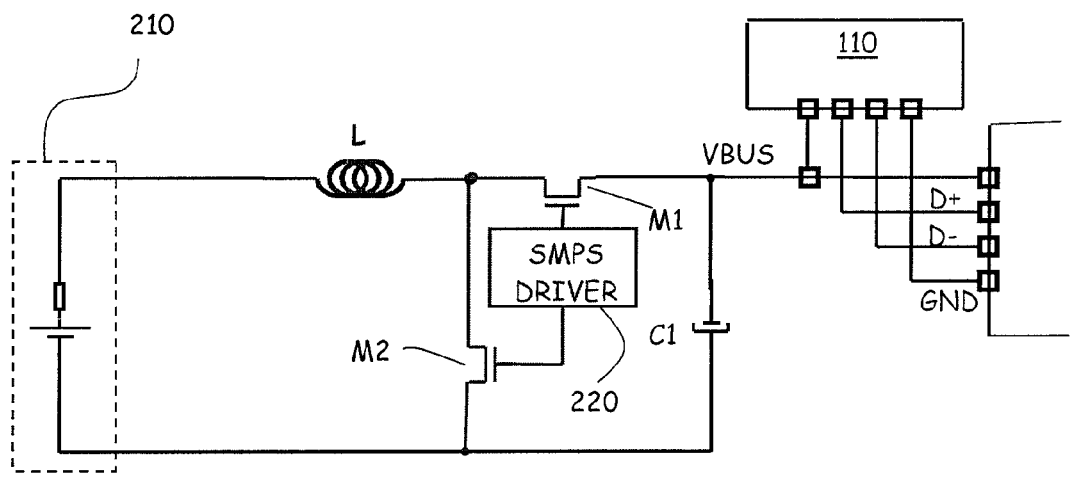
FIG. 3A shows the power management unit of FIG. 2, when operated to act as a voltage down-converter for charging a battery of the USB OTG device.

In particular, when the mobile phone 105 acts as a USB host, and a USB peripheral device is connected thereto, the switched-mode power supply driving circuit 220 drives the second transistor M2 to step-up the battery voltage to the USB voltage value. FIG. 3A depicts the power management unit 215 of FIG. 2 in this operating condition. In this case, the switched-mode power supply driving circuit 220 causes the first transistor M1 to switch on when the PWM control signal is off (the second transistor M2 is driven by a PWM signal in phase opposition to the PWM signal driving the first transistor M1) in order to discharge the inductor energy to the first capacitor C1.

Figure 3B:
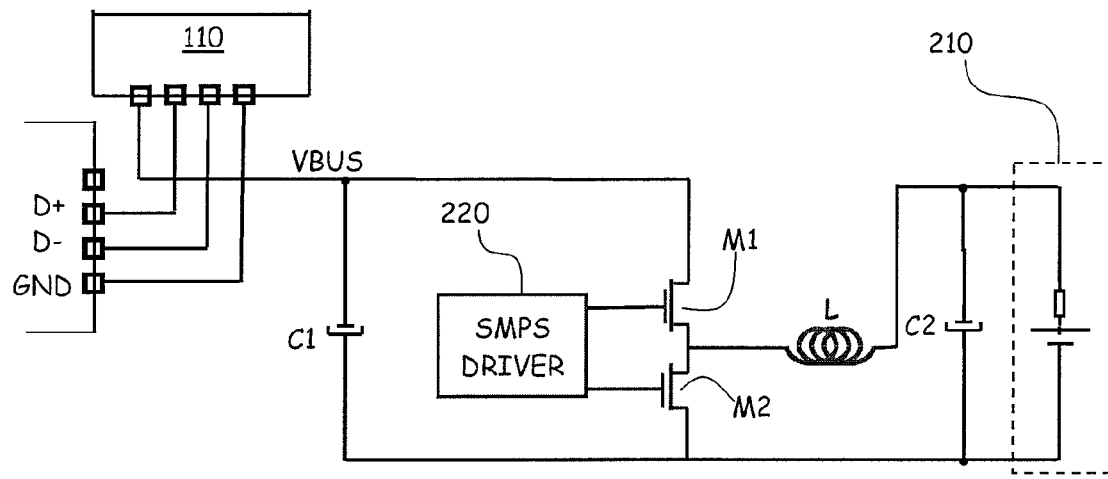
FIG. 3B shows the power management unit of FIG. 2, when operated to act as a voltage step-up for generating the USB voltage starting from the battery voltage.

When instead the mobile phone 105 acts as a USB peripheral, the switched-mode power supply driving circuit 220 drives the second transistor M1 to down-convert the USB voltage so as to charge the battery 210. FIG. 3B depicts the power management unit 215 of FIG. 2 in this operating condition. In this case the switched-mode power supply driving circuit 220 causes the first transistor M2 to switch on when the PWM control signal is off (the second transistor M1 is driven by a PWM signal in phase opposition to the PWM signal driving the first transistor M2) in order to discharge the inductor energy.

The operation mode (voltage step-up or voltage step-down) of the power management unit 215 is in particular determined by a result of a negotiation between the mobile phone 105 and the USB device which is from time to time connected thereto, for determining which USB device will act as a host, and which instead will act as a peripheral.

The first and second transistors M1 and M2 and the switched-mode power supply driving circuit 220 can be integrated in monolithic form in a same chip. The inductor L and the capacitors C1 and C2 may be external, discrete components.

A diode D may be connected in parallel to the first transistor M1. The diode D, which is optional can be used in alternative to the first transistor M1 in the voltage step-up operating mode. In this case the transistor M1 can be kept off Thus, thanks to the fact that the mobile phone 105 is, from time to time, expected to act either as a USB host or as a USB peripheral, but is never expected to perform the two functions concurrently, it is possible to exploit a same circuit structure to perform both the functions of voltage step-up, for rising the battery voltage to the USB voltage value, and of voltage down-conversion, for lowering the USB voltage to a value compatible with the battery, so as to exploit the USB voltage to re-charge the battery.

This allows saving components, particularly bulky and expensive components like inductors, and thus to save area and reduce costs.

The present invention has been herein described making reference to an exemplary embodiment thereof. Those skilled in the art will readily recognize that several changes to the described embodiment are possible, as well as different invention embodiments.

In particular, although reference has been explicitly made to a mobile phone, the present invention can be advantageously used in any battery-operated electronic device, like for example smart phones, PDAs, digital still cameras, camcorders.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A power management unit for a battery-operated electronic device having a bus interface for the interconnection with another electronic device, the power management unit comprising:
an electric energy storage element coupled between a battery of the battery-operated electronic device and a voltage supply line of the bus interface, the electric energy storage element being operable to charge/discharge electric energy;
a drive circuitry arranged to control a charge/discharge of the electric energy storage element, wherein the drive circuitry is operable to:
cause an electric power supplied by said another electronic device through the voltage supply line to re-charge the battery, as being reduced in voltage from a nominal voltage of about 5.0 volts to a nominal voltage of about 3.6 volts by a DC-DC voltage step-down converter having an inductor; or
in case said another electronic device does not supply electric power, cause the battery to supply electric power to said another electronic device through said voltage supply line, as being increased in voltage from a nominal voltage of about 3.6 volts to a nominal voltage of about 5.0 volts by a DC-DC voltage step-up converter that utilizes the inductor of the DC-DC voltage step-down converter.

2. The power management unit of claim 1, wherein:
said inductor has a first terminal coupled between a battery of the battery-operated electronic device and a second terminal coupled to a voltage supply line of the bus interface; and
said drive circuitry is arranged to control a charge/discharge of the inductor.

3. The power management unit of claim 2, wherein said drive circuitry is a switched-mode circuitry.

4. The power management unit of claim 3, wherein the switched-mode drive circuitry comprises:
a first switch coupled between the voltage supply line and the second terminal of the inductor;
a second switch coupled between the second terminal of the inductor and a reference voltage terminal of the battery;
a switch control circuit operable to control the first and second switch.

5. The power management unit according to claim 4, wherein said switch control circuit is operable to generate PWM control signals for controlling the opening and closing of the first and second switch.

6. The power management unit of claim 5, wherein said switch control circuit is operable to generate first and second PWM control signals in phase opposition for controlling the first and second switch.

7. The power management unit of claim 1, wherein said bus interface is a USB interface.

8. A battery-operated electronic device having a bus interface for the connection to another electronic device and a power management unit according to claim 1.

9. A method of managing power in a battery-operated electronic device having a bus interface for the interconnection with another electronic device, the method comprising:
charging a battery of the battery-operated electronic device with a terminal of the battery connected to the another device through a voltage supply line and an inductor when the another device is capable of supplying energy to recharge the electric energy storage element, energy supplied from the another device having a nominal value of about 5.0 volts; and
discharging the battery of the battery-operated electronic device with the terminal of the battery connected to the another device through the voltage supply line and the inductor when the another device is incapable of supplying energy to recharge the electric energy storage element, energy supplied by the battery having a nominal value of about 3.6 volts.

10. The method of claim 9, further comprising:
controlling a discharge/charge of the inductor with a drive circuit to control charging/discharging of the battery.

11. The method of claim 10, wherein the drive circuit is a switched-mode drive circuitry including a first switch coupled between the voltage supply line and a second terminal of the inductor and a second switch coupled between a second terminal of the inductor and a reference voltage terminal of the battery.

12. The method of claim 11, further comprising:
controlling the first and second switch depending on whether the battery-operated electronic device is connected to another device that is capable of supplying energy or is incapable of supplying energy.

13. The method of claim 12, wherein controlling the first and second switch includes generating PWM control signals for controlling the opening and closing of the first and second switch.

14. The method of claim 13, wherein generating PWM control signals includes generating first and second PWM control signals in phase opposition for controlling the first and second switch.

15. A power management unit for a battery-operated electronic device having a bus interface for the interconnection with another electronic device, the power management unit comprising:
an electric energy storage element coupled between a battery of the battery-operated electronic device and a voltage supply line of the bus interface, the electric energy storage element being operable to charge/discharge electric energy;
a drive circuitry arranged to control a charge/discharge of the electric energy storage element, wherein the drive circuitry includes:
a DC-DC voltage step-down converter including an inductor and that reduces a voltage provided to a terminal of the battery from the another device through the voltage supply line and the inductor when the another device is capable of supplying energy to recharge the electric energy storage element, the voltage reduction being from a nominal voltage of about 5.0 volts to a nominal voltage of about 3.6 volts; and
a DC-DC voltage step-up converter that utilizes the inductor of the DC-DC voltage step-down converter and that increases a voltage provided to the voltage supply line from the terminal of the battery when the another device is incapable of supplying energy to recharge the electric energy storage element, the voltage increase being from a nominal voltage of about 3.6 volts to a nominal voltage of about 5.0 volts.

* * * * *